(12) United States Patent
Loduca

(10) Patent No.: US 10,118,080 B2
(45) Date of Patent: Nov. 6, 2018

(54) SYSTEMS, DEVICES, AND METHODS FOR VIRTUAL AND AUGMENTED REALITY SPORTS TRAINING

(71) Applicant: Robosport Technologies, LLC, Whitestone, NY (US)

(72) Inventor: Salvatore Loduca, Great Neck, NY (US)

(73) Assignee: Robosport Technologies, LLC, Whitestone, NY (US)

( * ) Notice: Subject to any disclaimer, the term of this patent is extended or adjusted under 35 U.S.C. 154(b) by 0 days.

(21) Appl. No.: 15/437,913

(22) Filed: Feb. 21, 2017

(65) Prior Publication Data

US 2018/0236335 A1     Aug. 23, 2018

(51) Int. Cl.
*G06F 17/00* (2006.01)
*A63B 69/00* (2006.01)

(52) U.S. Cl.
CPC .. *A63B 69/0002* (2013.01); *A63B 2069/0008* (2013.01); *A63B 2220/64* (2013.01)

(58) Field of Classification Search
None
See application file for complete search history.

(56) References Cited

U.S. PATENT DOCUMENTS

| | | | |
|---|---|---|---|
| 4,870,868 A | 10/1989 | Gastgeb et al. | |
| 5,160,131 A * | 11/1992 | Leon | A63B 69/409 124/56 |
| 6,296,582 B1 * | 10/2001 | Minniear | A63B 69/0002 473/422 |
| 7,828,679 B2 * | 11/2010 | Tell | A63B 69/0002 473/417 |
| 7,980,966 B2 * | 7/2011 | Tell | A63B 69/0002 473/417 |
| 8,033,925 B2 | 10/2011 | Hardage | |
| 8,425,352 B1 | 4/2013 | Loduca et al. | |
| 8,876,621 B2 | 11/2014 | Shibuya | |
| 9,033,828 B2 | 5/2015 | LoDuca et al. | |
| 9,555,307 B1 * | 1/2017 | Lewis | A63B 69/409 |
| 9,694,238 B2 * | 7/2017 | Marty | A63B 24/0003 |
| 2003/0207718 A1 | 11/2003 | Perlmutter | |
| 2006/0211523 A1 | 9/2006 | Sabatino | |
| 2013/0095940 A1 | 4/2013 | Dugan | |
| 2016/0250543 A1 * | 9/2016 | Bocchetti | A63B 69/0057 473/266 |

* cited by examiner

*Primary Examiner* — Ronald Laneau
(74) *Attorney, Agent, or Firm* — Carter, Deluca, Farrell & Schmidt, LLP

(57) ABSTRACT

Disclosed are devices, systems, and methods for training a player to hit a ball at a target using a virtual or augmented reality display device, an exemplary method including detecting a position of a real ball, determining a trajectory for a virtual ball, the trajectory intersecting with the detected position of the real ball, displaying, by the virtual or augmented reality display device, a virtual pitch of the virtual ball along the trajectory intersecting with the detected position of the real ball, displaying, by the virtual or augmented reality display device, a target towards which the player should hit the real ball, determining whether the real ball is hit at the target, and providing an indication of whether the real ball is hit at the target.

20 Claims, 4 Drawing Sheets

SYSTEMS, DEVICES, AND METHODS FOR VIRTUAL AND AUGMENTED REALITY SPORTS TRAINING

CROSS-REFERENCE TO RELATED APPLICATIONS

The present application is related to commonly-owned co-pending U.S. patent application Ser. No. 15/437,793, entitled "DETECTING AND ASSESSING VIBRATIONS CAUSED BY SPORTING EQUIPMENT", Ser. No. 15/437,827, entitled "DEVICE FOR DETECTING AND ASSESSING VIBRATIONS CAUSED BY SPORTING EQUIPMENT", Ser. No. 15/437,860, entitled "SYSTEMS, DEVICES, AND METHODS FOR VIRTUAL AND AUGMENTED REALITY SPORTS TRAINING", and Ser. No. 15/437,913, entitled "VIRTUAL SMART NET FOR USE IN SPORTS TRAINING", all filed on Feb. 21, 2017 by Salvatore LoDuca, the entire contents of each of which is incorporated herein by reference.

BACKGROUND

Technical Field

The present disclosure relates to sports training, and particularly to the use of sensors and virtual and/or augmented reality technologies to train athletes and players to improve coordination, timing, and/or skill.

Description of Related Art

Various sporting activities, such as baseball, softball, golf, tennis, hockey, etc., involve a player holding a sporting implement, such as a bat, club, racket, or stick, and moving, such as by a swinging motion, the sporting implement to make contact with a ball, puck, or the like. The player's skill may be judged based on his or her ability to swing the sporting implement in such a way as to make contact with an approaching ball, puck, or the like such that the ball, puck, or the like is hit in a desired direction and at a desired speed.

For example, in the sports of baseball and softball, a batter's skill may be judged by the batter's ability to hit a ball in a desired direction, angle, and/or speed. When the point of impact between the ball and a baseball bat is at, or close to, the center of the bat, the hit may be called a "clean hit." A clean hit may send the ball at the greatest speed and allow the batter to best direct the ball in the desired direction. Training a batter to be able to make a clean hit is hard. The batter may be able to generally determine whether a particular hit was good or not by looking at the direction and speed the ball travels after making contact with the bat. However, the batter will not be able to determine whether the hit was a clean hit, or how close the point of impact between the ball and the bat was to the center of the bat merely by looking at the result of the hit.

SUMMARY

Provided in accordance with the present disclosure is a system for training a player to hit a real ball at a target using a virtual or augmented reality display device. In an aspect of the present disclosure, the system includes a virtual or augmented reality display device configured to detect a position of a real ball, determine a trajectory for a virtual ball, the trajectory intersecting with the detected position of the real ball, display a virtual pitch of the virtual ball along the trajectory intersecting with the detected position of the real ball, display a target towards which the player should hit the real ball, determine whether the real ball is hit at the target, and provide an indication of whether the real ball is hit at the target. The system further includes a glove worn by a player, the glove including a sensor configured to detect vibrations caused by an impact between a bat and the real ball, and determine whether a level of the vibrations is within a predetermined range, and a speaker within audible range of the player, the speaker configured to emit an audible tone in response to receiving a signal from the sensor indicating that the level of the vibrations is within the predetermined range.

In another aspect of the present disclosure, the speaker is further configured to emit an audible tone when it is determined that the real ball is hit at the target.

In yet another aspect of the present disclosure, the system further includes a robotic tee, and the real ball is positioned on the robotic tee.

In still another aspect of the present disclosure, the speaker is included in an earpiece worn by the player.

In yet another aspect of the present disclosure, the speaker is included in the virtual or augmented reality display device.

In still another aspect of the present disclosure, the virtual or augmented reality display device is further configured to receive data from the sensor, the data including the detected level of vibrations, analyze the data received from the sensor to determine analytics and statistics regarding the impact between the bat and the real ball, and display the analytics and statistics.

In yet another aspect of the present disclosure, the virtual or augmented reality display device is further configured to receive data from the sensor, the data including the detected level of vibrations, analyze the data received from the sensor to determine one or more of a hitting pattern, a swing path, a swing style, a swing speed, a swing angle, and a timing metric, and generate guidance based on the determining.

In a further aspect of the present disclosure, the virtual or augmented reality display device is further configured to display the guidance.

Provided in accordance with the present disclosure is a non-transitory computer-readable storage medium storing a program for using a virtual or augmented reality device for training a player to hit a real ball at a target, the program including instructions which, when executed by a processor, cause a computing device to detect a position of a real ball based on an image captured by a camera coupled to the virtual or augmented reality display device, determine a trajectory for a virtual ball, the trajectory intersecting with the detected position of the real ball, display a virtual pitch of the virtual ball along the trajectory intersecting with the detected position of the real ball, cause the virtual or augmented reality display device to display a target towards which the player should hit the real ball, determine, based on an image captured by the camera coupled to the virtual or augmented reality display device, whether the real ball is hit at the target, and provide an indication of whether the real ball is hit at the target.

In another aspect of the present disclosure, the real ball is positioned on a robotic tee.

In yet another aspect of the present disclosure, the instructions, when executed by the processor, further cause the computing device to cause a speaker to emit an audible tone when it is determined that the real ball is hit at the target.

In still another aspect of the present disclosure, the instructions, when executing by the processor, further cause the computing device to receive data including a detected level of vibrations from a sensor, analyze the data received from the sensor to determine analytics and statistics regarding an impact between a bat and the real ball, and cause the virtual or augmented reality display device to display the analytics and statistics.

In yet another aspect of the present disclosure, the instructions, when executing by the processor, further cause the computing device to receive data including a detected level of vibrations from a sensor, analyze the data received from the sensor to determine one or more of a hitting pattern, a swing path, a swing style, a swing speed, a swing angle, and a timing metric, and generate guidance based on the determining.

In a further aspect of the present disclosure, the instructions, when executing by the processor, further cause the computing device to cause the virtual or augmented reality display device to display the guidance.

Provided in accordance with the present disclosure is a method of training a player to hit a real ball at a target using a virtual or augmented reality display device. In an aspect of the present disclosure, the method includes detecting a position of a real ball, determining a trajectory for a virtual ball, the trajectory intersecting with the detected position of the real ball, displaying, by the virtual or augmented reality display device, a virtual pitch of the virtual ball along the trajectory intersecting with the detected position of the real ball, displaying, by the virtual or augmented reality display device, a target towards which the player should hit the real ball, determining whether the real ball is hit at the target, and providing an indication of whether the real ball is hit at the target.

In another aspect of the present disclosure, the indication of whether the ball is hit at the target is displayed by the virtual or augmented reality display device.

In yet another aspect of the present disclosure, the indication of whether the ball is hit at the target is provided as an audible tone emitted by a speaker.

In still another aspect of the present disclosure, the method further includes receiving data including a detected level of vibrations from a sensor, analyzing the data received from the sensor to determine analytics and statistics regarding an impact between a bat and the real ball, and displaying the analytics and statistics.

In yet another aspect of the present disclosure, the method further includes receiving data including a detected level of vibrations from a sensor, analyzing the data received from the sensor to determine one or more of a hitting pattern, a swing path, a swing style, a swing speed, a swing angle, and a timing metric, and generate guidance based on the determining.

In a further aspect of the present disclosure, the method further includes displaying the guidance.

Any of the above aspects and embodiments of the present disclosure may be combined without departing from the scope of the present disclosure.

BRIEF DESCRIPTION OF THE DRAWINGS

Various aspects and features of the present disclosure are described hereinbelow with references to the drawings, wherein.

DETAILED DESCRIPTION

Figure 1:
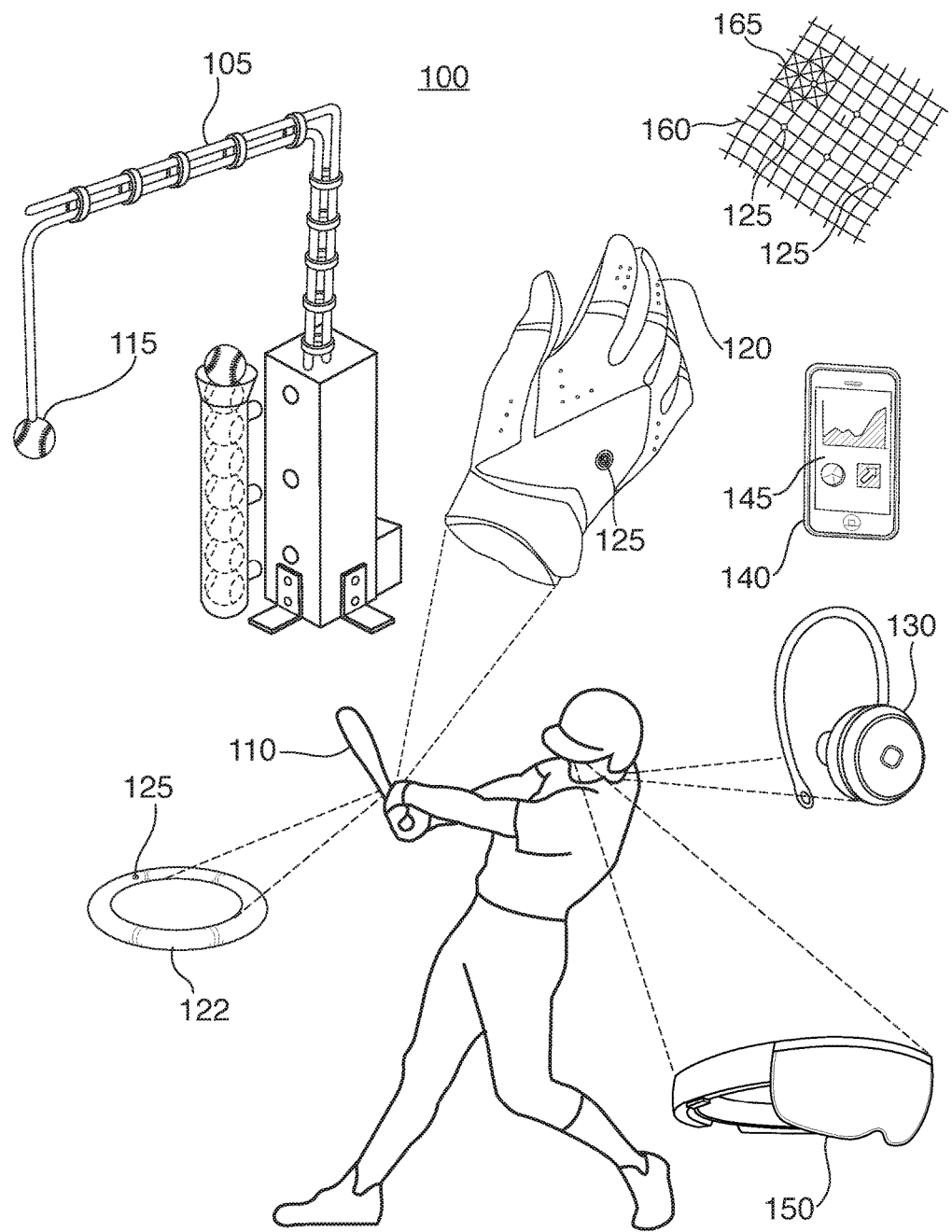
FIG. 1 is a schematic diagram of a system for using virtual or augmented reality in sports training, provided in accordance with an embodiment of the present disclosure.

The present disclosure is directed to devices, systems, and methods for sports training using various sensors and virtual and/or augmented reality technologies to train athletes and players to improve coordination, timing, and/or skill. More particularly, the disclosure relates to using various sensors and virtual and/or augmented reality visuals to create an immersive training environment for the player to be used in conjunction with the detection of vibrations and/or impacts by one or more sensors to determine whether an impact between sporting equipment and a ball resulted in a clean hit, and thereby providing an indication to the player as to whether the hit was a clean hit. The disclosure further provides for devices, systems, and methods for training the player to hit different types of pitches as well as direct the ball in a particular direction and/or toward a particular target. Thus, the disclosure describes methods for training a player to improve timing based on repetition and randomization to thereby improve muscle memory for reacting to different types of pitches, different speeds of pitches, different ball positions, etc.

As described in detail below, one or more sensors may be included in a glove to be worn by a player holding a bat, club, racket, or stick, and detect vibrations in the bat, club, racket, or stick caused by the impact with a ball, puck, or the like, as well as a swing path and/or swing angle of the bat, club, racket, or stick. Additionally or alternatively, the one or more sensors may also be attached to the bat, club, racket, or stick, such as by a ring, patch, sticker, etc., and/or embedded in the bat, club, racket, or stick, or included in a wristband, smartwatch, or other device attached to the player's body. The one or more sensors may be paired with an earpiece, also worn by the player, which emits an audible tone upon detection of a clean hit to indicate to the player that a hit was a clean hit. The virtual and/or augmented reality visuals may be displayed to the player via a virtual and/or augmented reality device, such as a headset or other head-mounted gear, worn by the player. The virtual and/or augmented reality visuals may display various types of pitches, speeds of pitches, ball positions, etc., to the player to hit the ball, as well as a direction and/or target toward which to hit the ball. One or more sensors may be connected to and/or embedded in a net positioned to catch the ball after being hit by the player. The sensors may detect a position and/or area at which the ball impacts the net.

As used herein, the term clean hit refers to a hit wherein there is clean contact between the center of the ball and the barrel of the bat, resulting in the majority of the energy from the impact between the bat and the ball being transferred to the ball to direct the ball in a desired direction. While making clean contact with the ball is important for attaining a clean hit, the path and/or angle at which the bat is swung by the player, as well as the timing and the point of contact with the ball are equally important for making a clean hit and directing the ball in a desired direction.

As noted above, and as will be appreciated by those skilled in the art, the systems, devices, and methods of the present disclosure may be used in various sports, including baseball, softball, golf, tennis, racquetball, hockey, and/or cricket, among others. However, for purpose of brevity, the present disclosure will use the sport of baseball as an exemplary embodiment. This is not intended to be limiting, as those skilled in the art will appreciate that the same or similar systems, devices, and methods may be used in other sports as well, including but not limited to the sports named above.

Referring now to FIG. 1, there is shown a diagram of a system 100 for facilitating sports training using various sensors and virtual and/or augmented reality technologies, according to an embodiment of the present disclosure. As will be appreciated by those skilled in the art, the various components of system 100 shown in FIG. 1 are not drawn to scale. System 100 includes a bat 110 held by a player wearing a glove 120. Bat 110 has connected thereto a ring 122 including one or more sensors 125 for detecting vibrations caused by bat 110 making contact with a ball 115. Alternatively or additionally, bat 110 may have embedded therein one or more sensors 125 (not shown). Similarly, glove 120 includes one or more sensors 125. Ball 115 may be held in place by a tee, such as a robotic tee 105, until the player hits ball 115. Robotic tee 105 may be any robotic tee known to those skilled in the art, including a single axis robotic tee and/or a multi-axis robotic tee. For example, robotic tee 105 may be capable of full randomization, that is, robotic tee 105 may place ball 115 in a fully randomized location within the three dimensions of the player's strike zone for every hit, thereby requiring the player to prepare and adjust position for every hit.

The player may wear an earpiece 130 paired with sensor 125 and configured to emit an audible tone when a hit is detected. The player may further wear a display device 150, such as a virtual and/or augmented reality headset, e.g. the RIFT® device marketed by OCULUS®, the HOLOLENS® device marketed by MICROSOFT®, the GLASS® device marketed by GOOGLE®, the PLAYSTATION® VR® device marketed by SONY®, the GEAR VR® device marketed by SAMSUNG®, and/or any other suitable virtual and/or augmented reality device known to those skilled in the art. System 100 further includes a net 160 equipped with a plurality of sensors 125 for detecting an impact between ball 115 and net 160. Sensors 125 in net 160 may be positioned such that net 160 is divided into various zones which can be selectively used as a target 165. Net 160 may further include one or more display elements (not shown) such as light-emitting diode (LED) and/or fiber optic lights configured to light up to indicate the position of target 165 on net 160. A computing device 140, including an application 145, may also be paired with sensors 125 in bat 110, glove 120, ring 122, and/or net 160, as well as earpiece 130 and/or display device 150, and may provide further data, analytics, and statistics about the impacts between bat 110 and ball 115, and between ball 115 and net 160, and may be used to configure and/or operate sensors 125, earpiece 130, display device 150, and/or net 160.

Sensor 125 may be a displacement sensor, velocity sensor, accelerometer, and/or other sensors capable of detecting motion, impacts, and/or vibrations known to those skilled in the art. Sensor 125 may include or be connected to a logic circuit (not shown) configured to analyze the impacts and/or vibrations detected by sensor 125 and, if the vibrations detected by sensor 125 exceeds a predetermined value, send a signal to earpiece 130 to emit the audible tone. Sensor 125 may further detect a swing path and/or swing angle of bat 110. Sensors 125 in net 160 may similarly detect where on net 160 an impact with ball 115 has occurred. The logic circuit may include a processor and a memory. Sensor 125 may further include or be connected to a connection interface, such as a BLUETOOTH® interface, wireless network interface, cellular network interface, near field communications (NFC) interface, and/or any other applicable connection interface known to those skilled in the art. Sensor 125 may, via the connection interface, connect to, or be paired with, earpiece 130, computing device 140, and/or display device 150, and may send the signal to earpiece 130 via a connection established via the connection interface.

Earpiece 130 may be any audio output device capable of connecting to and/or receiving a signal from sensor 125 to emit the audible tone. For example, earpiece 130 may be an in-ear wearable device including a speaker. In some embodiments, earpiece 130 may instead be a wearable speaker, such as a speaker attached to a clip, band, and/or string, which may be attached to clothing worn by the player, attached directly to the player' body, or attached to or embedded in glove 120. In other embodiments, earpiece 130 may not be wearable but instead be a speaker designed to be positioned near the player. In still further embodiments, earpiece 130 may be integrated with computing device 140 and/or display device 150 such that a speaker of computing device 140 and/or display device 150 is used to emit the audible tone when the signal from sensor 125 is received.

Computing device 140 may be any computing device capable of connecting to and/or receiving data from sensor 125 and executing and displaying application 145. For example, computing device 140 may be a smartphone, tablet computer, laptop computer, desktop computer, wearable computing device such as a smartwatch, and/or any other applicable computing device known to those skilled in the art. In some embodiments, computing device 140 and display device 150 may be a single, integrated device. Computing device 140 receives data from sensor 125 regarding the vibrations detected by sensor 125 and, via application 145, analyzes the received data to compile analytics and statistics regarding the impacts between bat 110 and ball 115. For example, application 145 may determine a score for each hit based on a level of vibration detected by sensor 125. A clean hit will result in very low vibrations, and may be given a high score. A hit resulting in very high vibrations, will not be a clean hit and may be given a low score. Thus, as described further below, in an embodiment where the system operates in a binary mode, that is, either a clean hit or not a clean hit, a clean hit may result in an audible tone being emitted by earpiece 130, and a hit that is not a clean hit results in no tone being emitted by earpiece 130. In other embodiments, hits resulting in vibrations within multiple intervals between the high and low levels of vibrations may be given intermediate scores based on their level of vibrations, and may result in various audible tones being emitted by earpiece 130 depending on the score and/or detected levels of vibrations.

Application 145 may further analyze data received from sensor 125 to determine a swing path, swing angle, and/or swing velocity of bat 110, and the timing of the impact between bat 110 and ball 115. Application 145 may then generate guidance and/or instructions for making adjustments to improve the player's hitting pattern and/or style based on the data, analytics, and/or statistics. The guidance may be further be based on delta values relating to changes in the player's performance.

As noted above, display device 150 may be any virtual and/or augmented reality display device known to those skilled in the art. In the exemplary embodiments described below, display device 150 is a head-mounted display device 150, but such description and disclosure is not intended to be limiting. Display device 150 may include one or more cameras and/or other optical sensors to scan and/or capture images of the area around the player and detect objects in the area around the player, as described further below. Display device 150 includes at least one processor and memory to process and store the images captured by the one or more cameras and generate virtual and/or augmented reality images to be displayed on a screen, and/or one or more speakers to output audio.

As will be appreciated by those skilled in the art, the level of vibrations may differ between various bats based on the size, shape, type of material, and/or method of construction of the bat. Thus, sensor 125 may be pre-programmed based on levels of vibrations known to be caused by a particular type of bat. Alternatively, or in addition, sensor 125 may be configured to "learn" levels of vibrations of a bat during use of system 100. For example, sensor 125 may be calibrated before use with a particular bat and/or may manually or automatically adjust thresholds and/or ranges of levels of vibrations, whether binary or multiple, based on levels of vibrations detected during use. Thus, thresholds for the various levels of vibrations may be preset and/or calibrated during use of sensor 125. For example, application 145 may be used to configure and/or calibrate sensor 125.

Figure 2:
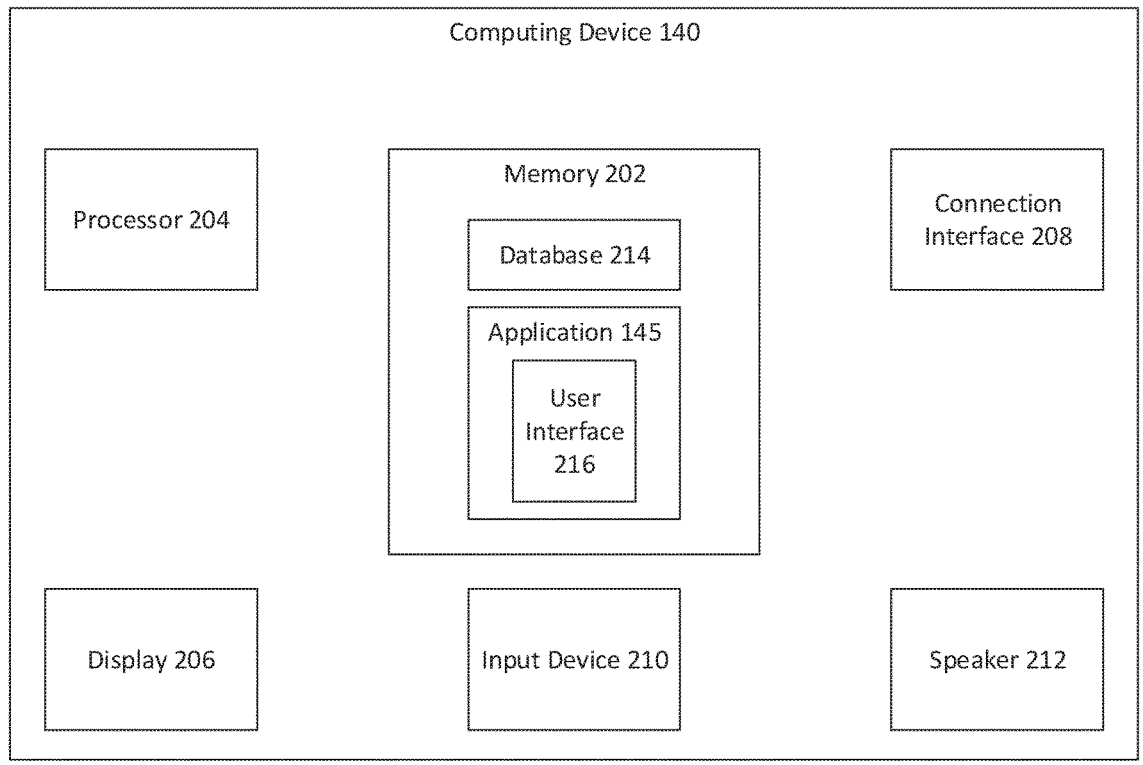
FIG. 2 is a simplified block diagram of a computing device forming part of the system of FIG. 1, provided in accordance with an embodiment of the present disclosure.

Turning now to FIG. 2, there is shown a simplified block diagram of computing device 140, according to an embodiment of the present disclosure. As noted above, computing device 140 may be one or more of various computing devices known to those skilled in the art, and the components described below are merely for illustrative purposes and not intended to be limiting.

Computing device 140 may include a memory 202, a processor 204, a display 206, a connection interface 208, an input device 210, and/or a speaker 212. Memory 202 may store application 145 and/or a database 214. Application 145 may, when executed by processor 204, cause display 206 to display user interface 216. Connection interface 208 may be a BLUETOOTH® interface, a wireless networking interface, a cellular networking interface, an NFC interface, and/or any other applicable connection interface known to those skilled in the art. Computing device 140 may connect to sensor 125, earpiece 130, and/or display device 150 via a connection established by connection interface 208. Computing device 140 may store data received from sensor 125 in database 214. The data may include the level of vibration detected for each hit, and/or whether the level of vibration exceeded a threshold to cause sensor 125 to send the signal to earpiece 130 to emit the audible tone. The data may further include data regarding swing paths, swing angles, swing speed, and/or timing of impacts between bat 110 and ball 115.

Figure 3A:
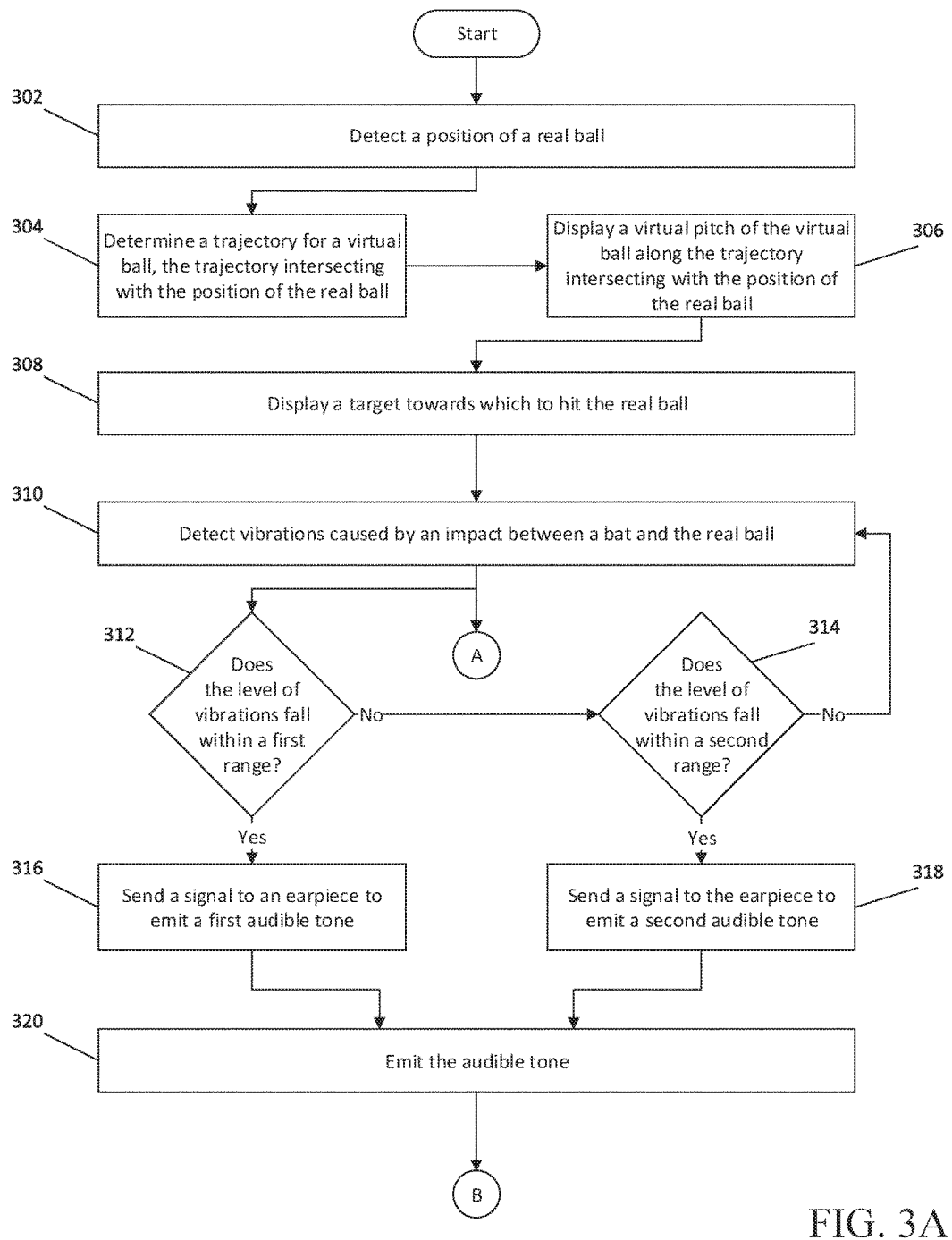
FIGS. 3A and 3B depict a flowchart illustrating an exemplary method of using virtual and/or augmented reality in sports training, provided in accordance with and embodiment of the present disclosure.
Figure 3B:
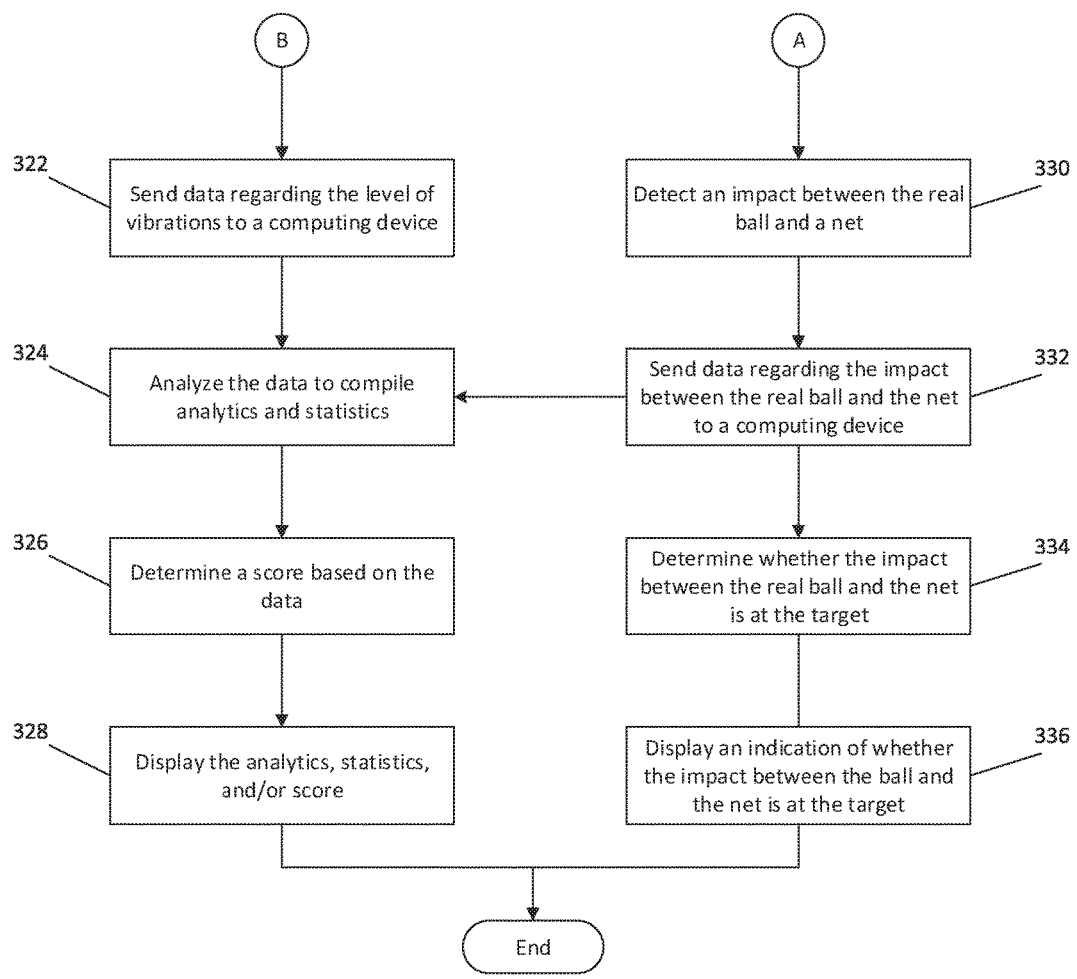

Referring now to FIGS. 3A and 3B, there is shown a flowchart of an exemplary method for facilitating sports training using various sensors and virtual and/or augmented reality technologies, according to an embodiment of the present disclosure. Various steps of the method are described below in an example sequence allowing system 100 of FIG. 1 to be used during batting practice for the sports of baseball and/or softball. However, as will be appreciated by those skilled in the art, the same or similar steps may be performed for using systems and devices similar to those of FIG. 1 in various other sports. Further, various steps of the method may be performed concurrently and/or in a different sequence than that described below, or may be omitted, without departing from the scope of the present disclosure.

The method may begin at step 302, where the position of a real ball, such as ball 115, is detected. The ball 115 may be held in place by a tee, such as robotic tee 105. The detection may be performed by a virtual and/or augmented reality headset, such as display device 150. For example, as noted above, display device 150 may include one or more cameras configured to detect objects, such as ball 115, in the area around the player. In embodiments where robotic tee 105 is used, the position of ball 115 may change for each pitch. Robotic tee 105 may also be linked to display device 150 such as to determine a position for ball 115 in relation to the player.

Next, at step 304, a trajectory for a virtual ball is determined such that the trajectory intersects with the detected position of ball 115. For example, display device 150 may display images to the player of a virtual pitcher pitching a virtual ball to the player. The trajectory of the virtual ball will intersect with the detected position of ball 115 such that the player may hit ball 115 when the virtual ball intersects with the position of ball 115. To accomplish this, display device 150 determines a trajectory for the virtual ball from the virtual pitcher to the detected position of ball 115. A predetermined and/or randomized virtual pitch may be selected by display device 150 to be displayed to the player based on the determined trajectory of the virtual ball. For example, various virtual pitches may be stored in database 214. The virtual pitches may be based on various types of pitches, speeds of pitches, etc. The virtual pitches may be performed by left-handed and/or right-handed virtual pitchers, as displayed by display device 150. By selecting a randomized virtual pitch for each pitch displayed to the player, the player may be trained to be prepared for full randomization.

In an embodiment where display device 150 is a virtual reality device, display device 150 may display images of a real-world location to the player to create an immersive experience. For example, the images of the real-world location may include images of a baseball stadium, a batting practice facility, and/or any other real-world location selected by the player. In another embodiment where display device 150 is an augmented reality device, display device 150 may simply display images of the virtual pitcher and the virtual ball, and the player may still be able to see ball 115 concurrently with the virtual ball.

Thereafter, at step 306, display device 150 displays the virtual pitch of the virtual ball along the trajectory determined at step 304, such that the virtual ball intersects with the detected position of ball 115. At step 308, a target is displayed towards which the player should attempt to hit ball 115. For example, display device 150 may display a target to the player in addition to, or overlaid onto, the images of the virtual pitcher and the virtual pitch of the virtual ball. Alternatively, or in addition, net 160 may display a target to the player by illuminating target zone 165. Thus, in an augmented reality embodiment, the player will be able to see target zone 165 light up on net 160. In some embodiments, the target is displayed before the virtual pitch of the virtual ball is displayed. In other embodiments, the target is displayed concurrently with the virtual pitch of the virtual ball.

When the virtual ball intersects with the position of ball 115, the player may hit ball 115 with bat 110 causing an impact between bat 110 and ball 115. The timing of the hit may be determined based on a difference in time between when the virtual ball intersects with ball 115, and when bat 110 makes contact with ball 115. Thereafter, at step 310, one or more sensors, such as sensor 125, detect vibrations caused by an impact between bat 110 and ball 115. The vibrations may be in various detectable frequencies, ranging from low frequencies to high frequencies, and may vary depending on the type of bat being used, as described above. In some embodiments, vibrations determined to be in frequencies outside of predefined ranges may be determined to be caused by impacts other than between bat 110 and ball 115, and may therefore be disregarded. Further, sensor 125 and/or application 145 may be configured to analyze the detected frequencies for abnormalities and, based on detected abnormalities, may determine that the detected frequencies indicate that the batter is using bat 110 incorrectly and/or that bat 110 may be damaged. Application 145 may then indicate to the player that the player is using bat 110 incorrectly and/or that bat 110 may be damaged. Application 145 may also recalibrate sensor 125 based on the detected abnormalities.

At step 312, it is determined whether the level of vibrations is within a first range of frequencies. The determination may be based on an assessment of the level of vibrations detected by sensor 125. The first range of frequencies may be a relatively low range of frequencies which resembles a clean hit, because during a clean hit there is clean contact between the center of the ball and the barrel of the bat, resulting in the majority of energy from the impact between bat 110 and ball 115 being transferred to the ball and thereby directing the ball into its new trajectory. The determination may be made by sensor 125 via the logic circuit connected to or included in sensor 125. Alternatively, sensor 125, after detecting the vibrations, may send a data packet including data regarding the detected level of vibrations to computing device 140, and application 145 may perform the determination whether the level of vibrations is within the first range.

If it is determined that the level of vibrations is within the first range, the method proceeds to step 316. However, if it is determined that the level of vibrations is not within the first range, the method proceeds to step 314. At step 314, it is determined whether the level of vibrations is within a second range of frequencies. The second range of frequencies may be relatively higher than the first range of frequencies, a higher frequency being indicative of a non-clean (and potentially poor) hit, because less energy from the impact between bat 110 and ball 115 is transferred to the ball and is instead released as vibrations in bat 110. As with step 312, the determination may be made by sensor 125 via the logic circuit connected to or included in sensor 125, or by application 145 after sensor 125 sends a data packet including data regarding the detected level of vibrations to computing device 140. If it is determined that the level of vibrations is within the second range, the method proceeds to step 318. However, if it is determined that the level of vibrations is not within the second range, the method returns to step 310.

At step 316, a signal is sent to earpiece 130 to emit a first audible tone. As noted above, earpiece 130 may be included in display device 150. The first audible tone may represent a clean hit, and the batter, upon hearing the first audible tone, may be informed that the hit just performed was a clean hit. The signal may be sent from sensor 125 if sensor 125 performs the determination whether the detected level of vibrations is within the first range of frequencies. Alternatively, if application 145 performs the determination whether the detected level of vibrations is within the first range of frequencies, the signal may be sent from computing device 140.

At step 318, a signal is sent to earpiece 130 to emit a second audible tone. The second audible tone may be one of various tones associated with various ranges of frequencies, as noted above regarding step 314. As with the signal sent at step 316, the signal to emit the second audible tone may be sent from sensor 125 if sensor 125 performs the determination whether the detected level of vibrations is within the second range of frequencies. Alternatively, if application 145 performs the determination whether the detected level of vibrations is within the second range of frequencies, the signal may be sent from computing device 140.

At step 320, earpiece 130, upon receiving the signal sent at either step 316 or step 318, emits the first or second audible tone corresponding to the signal. Upon hearing the audible tone, the player may be informed whether the hit just performed resulted in good contact with the bat, resulting in a low level of vibrations, or various other levels of contact with the bat, resulting in higher levels of vibrations. Display device 150 may also display a visual indication of whether or not the player hit a clean hit. By emitting the audible tone, the player may receive confirmation that the hit was a clean hit by three senses—visual by seeing the result of the hit, tactile by feeling the vibrations in bat 110, and auditory by hearing the audible tone. Receiving confirmation via multiple senses may improve the training of the player's brain to know what is a clean hit because the player is given feedback via multiple different senses.

At step 322, sensor 125 sends data regarding the detected level of vibrations to computing device 140. As noted above, if sensor 125 does not perform the determinations of step 312 and/or step 314, the data regarding the detected level of vibrations will be sent to computing device 140 before step 312 and step 314 is performed. After receiving the data regarding the detected level of vibrations, application 145, at step 324, may analyze the received data and compile analytics and statistics regarding the detected impact and level of vibrations. For example, application 145 may determine a hitting pattern, a swing path, a swing style, a swing speed, a swing angle, and/or a timing metric based on the received data. Computing device 140 may also store the received data and the compiled analytics and statistics in database 214. Display device 150 may display the analytics and statistics.

Application 145 may further, at step 326, determine a score based on the received data and/or the compiled analytics and statistics. The score may be an indication of how good or bad the hit was, as represented by level of vibrations detected by sensor 125. For example, if the level of vibrations is within the first range of frequencies, which represents a clean hit, application 145 may determine a good score. If the level of vibrations is within the second range of frequencies, application 145 may determine a lower score, based on the various ranges of frequencies noted above. Computing device 140 may also store the score in database 214. Display device 150 may also display the score. Application 145 may further determine guidance and/or instructions for making adjustments to improve the player's hitting pattern and/or style based on the data, analytics, and/or statistics. The guidance may be further based on delta values relating to changes in the player's performance. For example, application 145 may compare the data regarding one hit and its associated swing path, swing angle, and/or timing with similar data regarding another hit, and determine delta values based on differences between the data from the two hits. Application 145 may then generate guidance indicating adjustments the player may make to improve the player's swing style and/or timing based on the delta values. The guidance may further be stored by computing device 140 in database 214.

At step 328, computing device 140, via user interface 216 of application 145, may display the analytics and statistics compiled at step 324, the score determined at step 326, and/or the guidance. In some embodiments, the analytics, statistics, score, and/or guidance are displayed via display device 150.

Following step 310, and concurrently with steps 312-322, an impact between ball 115 and net 160 may be detected at step 330. For example, sensors 125 in net 160 may detect an impact, such as from force and/or displacement, with net 160. Alternatively or additionally, display device 150 may track ball 115 after ball 115 is hit by bat 110 to detect if and where ball 115 impacts net 160.

Thereafter, at step 332, sensor 125 in net 160 may send a data packet including data regarding the detected impact to computing device 140. Logic associated with sensor 125, application 145, and/or display device 150 may then, at step 334, determine where on net 160 the impact occurred, and whether the impact between ball 115 and net 160 was at target 165. Net 160 and/or display device 150 may then display, at step 336, an indication of where on net 160 the impact occurred and whether the impact was at target 165. Additionally, earpiece 130 may emit an audible tone indicating whether the impact between ball 115 and net 160 is at target 165.

Computing device 140 may receive data regarding the impact between ball 115 and net 160 at step 332. Thus, application 145 may further use such data at step 324 and step 326 to compile analytics, statistics, and/or the score.

Among the benefits of the present disclosure are the ability to provide fully randomized training in an immersive environment, thereby allowing the player to practice a variety of different hits and preparedness for a variety of different pitches, as well as training the player to adjust for every possibility and attempt to hit at targets. The effects of randomization and bilateral and/or contralateral training provides vastly improved results over uniform, repetitive, unilateral training. For example, the player may gain increased knowledge of the strike zone and ability to prepare for pitches in any position within the strike zone, while also learning proper contact, form, swing path, and/or swing angle for hitting a variety of types of pitches.

The above-described system 100 may be used in various different settings, and not all described components of system 100 need be used in each embodiment. For example, the player may use system 100 in conjunction with robotic tee 105, or with a non-robotic tee. That is, robotic tee 105 is an optional component of system 100 and need not be included in every setting where system 100 is used. Likewise, net 160 is an optional component of system 100, and as described above, the displaying of target 165 and detection of whether ball 115 is hit in the right direction to intersect with target 165 may be performed using display device 150 instead of or in addition to sensors 125 in net 160. Further information on the construction and operation of robotic tee 105 may be found in U.S. Pat. No. 8,425,352, entitled "Mechanical baseball tee", filed on Sep. 29, 2011, by LoDuca et al., U.S. Pat. No. 9,033,828, entitled "Mechanical baseball tee", filed on Mar. 15, 2013, by LoDuca et al., and U.S. patent application Ser. No. 15/244,057, entitled "ROBOTIC BATTING TEE SYSTEM", filed on Aug. 23, 2016, by LoDuca et al., the entire contents of each of which are incorporated herein by reference. Further, while using a robotic tee 105 is described above as a preferred embodiment, those skilled in the art will recognize that a stationary tee may also be used in some embodiments of system 100.

While several embodiments of the disclosure have been shown in the drawings, it is not intended that the disclosure be limited thereto, as it is intended that the disclosure be as broad in scope as the art will allow and that the specification be read likewise. Therefore, the above description should not be construed as limiting, but merely as exemplifications of particular embodiments. Those skilled in the art will envision other modifications within the scope and spirit of the claims appended hereto.

What is claimed is:

1. A system for training a player to hit a real ball at a target using a virtual or augmented reality display device, the system comprising:
a virtual or augmented reality display device having a camera, a display, and a computing device disposed therein, the computing device having:
one or more processors, and
at least one memory coupled to the one or more processors, the at least one memory having instructions stored thereon which, when executed by the one or more processors, cause the computing device to:
receive sensor signals from the camera and, based on the sensor signals, detect a position of a real ball;
determine a trajectory for a virtual ball, the trajectory intersecting with the detected position of the real ball;
transmit a signal that causes the display to display a virtual pitch of the virtual ball along the trajectory intersecting with the detected position of the real ball;
transmit a signal that causes the display to display a target towards which the player should hit the real ball;
determine whether the real ball is hit at the target; and
transmit to a speaker a signal that causes the speaker to provide an indication of whether the real ball is hit at the target;
wherein the virtual or augmented reality display device is configured to communicate with a glove worn by a player, the glove including a sensor configured to:
detect vibrations caused by an impact between a bat and the real ball; and
transmit to the computing device a signal that causes the computing device to determine whether a level of the vibrations is within a predetermined range; and
wherein the virtual or augmented reality display device is configured to communicate with the speaker within audible range of the player and cause the speaker to emit an audible tone in response to receiving a signal from the sensor indicating that the level of the vibrations is within the predetermined range.

2. The system according to claim 1, wherein transmitting to the speaker the signal that causes the speaker to provide an indication includes causing the speaker to emit an audible tone when it is determined that the real ball is hit at the target.

3. The system according to claim 1, further comprising:
a robotic tee configured to support the real ball thereon.

4. The system according to claim 1, wherein the speaker is included in an earpiece worn by the player.

5. The system according to claim 1, wherein the speaker is included in the virtual or augmented reality display device.

6. The system according to claim 1, wherein the at least one memory stores further instructions that, when executed by the one or more processors, cause the computing device to:

receive data from the sensor, the data including the detected level of vibrations;
analyze the data received from the sensor to determine analytics and statistics regarding the impact between the bat and the real ball; and
display the analytics and statistics on the display of the virtual or augmented reality display device.

7. The system according to claim 1, wherein the at least one memory stores further instructions that, when executed by the one or more processors, cause the computing device to:
receive data from the sensor, the data including the detected level of vibrations;
analyze the data of the glove received from the sensor to determine one or more of:
a hitting pattern,
a swing path,
a swing style,
a swing speed,
a swing angle, and
a timing metric; and
generate guidance based on the determining.

8. The system according to claim 7, wherein the at least one memory stores further instructions that, when executed by the one or more processors, cause the computing device to display the guidance via the display.

9. A non-transitory computer-readable storage medium storing a program for using a virtual or augmented reality device having a camera, a display, and a computing device disposed therein for training a player to hit a real ball at a target, the program including instructions which, when executed by a processor, cause the computing device to:
receive sensor signals from the camera and, based on the sensor signals, detect a position of a real ball based on an image captured by the camera;
determine a trajectory for a virtual ball, the trajectory intersecting with the detected position of the real ball;
transmit a signal that causes the display to display a virtual pitch of the virtual ball along the trajectory intersecting with the detected position of the real ball;
transmit a signal that causes the display to display a target towards which the player should hit the real ball;
determine, based on an image captured by the camera coupled to the virtual or augmented reality display device, whether the real ball is hit at the target; and
transmit to a speaker a signal that causes the speaker to provide an indication of whether the real ball is hit at the target.

10. The non-transitory computer-readable storage medium according to claim 9, wherein the real ball is positioned on a robotic tee.

11. The non-transitory computer-readable storage medium according to claim 9, wherein transmitting to the speaker the signal that causes the speaker to provide an indication also causes the speaker to emit an audible tone when it is determined that the real ball is hit at the target.

12. The non-transitory computer-readable storage medium according to claim 9, wherein the instructions, when executed by the processor, further cause the computing device to:
receive data from the glove including a detected level of vibrations from a sensor;
analyze the data received from the sensor to determine analytics and statistics regarding an impact between a bat and the real ball; and
transmit to the display a signal that causes the display to display the analytics and statistics.

13. The non-transitory computer-readable storage medium according to claim 9, wherein the instructions, when executed by the processor, further cause the computing device to:
receive data from the sensor of the glove including a detected level of vibrations;
analyze the data received from the sensor of the glove to determine one or more of:
a hitting pattern,
a swing path,
a swing style,
a swing speed,
a swing angle, and
a timing metric; and
generate guidance based on the determining.

14. The non-transitory computer-readable storage medium according to claim 13, wherein the instructions, when executed by the processor, further cause the computing device to cause the virtual or augmented reality display device to display the guidance on the display.

15. A method of training a player to hit a real ball at a target using a virtual or augmented reality display device having a camera, a display, and a computing device disposed therein, the method comprising:
detecting, by the camera, a position of a real ball;
determining a trajectory for a virtual ball, the trajectory intersecting with the detected position of the real ball;
displaying, by the display, a virtual pitch of the virtual ball along the trajectory intersecting with the detected position of the real ball;
displaying, by the display, a target towards which the player should hit the real ball;
determining whether the real ball is hit at the target; and
transmitting a signal to a speaker to cause the speaker to provide an indication of whether the real ball is hit at the target.

16. The method according to claim 15, wherein providing the indication of whether the ball is hit at the target is displayed by the display.

17. The method according to claim 15, wherein providing the indication of whether the ball is hit at the target is provided as an audible tone emitted by a speaker.

18. The method according to claim 15, further comprising:
receiving data, the glove configured to be worn by a player, including a detected level of vibrations from a sensor;
analyzing the data received from the sensor of the glove to determine analytics and statistics regarding an impact between a bat and the real ball; and
displaying, by the display, the analytics and statistics.

19. The method according to claim 15, further comprising:
receiving data from the sensor of the glove including a detected level of vibrations;
analyzing the data received from the sensor of the glove to determine one or more of:
a hitting pattern,
a swing path,
a swing style,
a swing speed,
a swing angle, and
a timing metric; and
generating, guidance based on the determining.

20. The method according to claim 19, further comprising displaying the guidance on the display.

\* \* \* \* \*